US012591689B2

(12) United States Patent
Reddy et al.

(10) Patent No.: US 12,591,689 B2
(45) Date of Patent: Mar. 31, 2026

(54) ANALYZING RISK FOR DEVICES WITHIN A MANAGED ENVIRONMENT

(71) Applicant: DELL PRODUCTS L.P., Round Rock, TX (US)

(72) Inventors: Karunakar Palicherla Reddy, Austin, TX (US); Charles D. Robison, Buford, GA (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 108 days.

(21) Appl. No.: 18/535,915

(22) Filed: Dec. 11, 2023

(65) Prior Publication Data

US 2025/0190578 A1     Jun. 12, 2025

(51) Int. Cl.
*G06F 21/00* (2013.01)
*G06F 21/57* (2013.01)

(52) U.S. Cl.
CPC ................................. *G06F 21/577* (2013.01)

(58) Field of Classification Search
None
See application file for complete search history.

(56) References Cited

U.S. PATENT DOCUMENTS 8,554,912 B1 10/2013 Reeves et al.
9,609,003 B1 3/2017 Chmielewski et al.

| 9,867,043 | B2 | 1/2018 | Aissi | |
|---|---|---|---|---|
| 10,218,697 | B2 | 2/2019 | Cockerill et al. | |
| 10,861,090 | B2 | 12/2020 | Haggerty et al. | |
| 11,159,505 | B1 | 10/2021 | Lester et al. | |
| 11,461,485 | B2 | 10/2022 | Beecham | |
| 11,488,136 | B2 | 11/2022 | Sharp et al. | |
| RE49,634 | E | 8/2023 | Hering et al. | |
| 11,818,129 | B2 | 11/2023 | Zerrad et al. | |
| 2011/0161659 | A1* | 6/2011 | Himawan | H04L 9/3263 |
| | | | | 713/156 |
| 2014/0095263 | A1* | 4/2014 | McAlister | G06Q 30/0206 |
| | | | | 705/7.35 |

(Continued)

OTHER PUBLICATIONS

Lenovo.com, "What is a computer peripheral, and why is it important?", Sep. 24, 2023, www.lenovo.com/us/en/glossary/computer-peripheral/, accessed Sep. 7, 2025, p. 1-13. (Year: 2023).*

*Primary Examiner* — Jeffery L Williams
(74) *Attorney, Agent, or Firm* — Jackson Walker L.L.P.

(57) ABSTRACT

Techniques for analyzing risk for devices within a managed environment are described. One example method includes receiving a provisioning request from a device including a device identifier, device credentials, and a current firmware revision, wherein the provisioning request indicates that the device is newly connected to the managed environment; verifying the authenticity of the device based at least in part on the device identifier and the device credentials; verifying that the current firmware revision of the device matches a master firmware revision associated with a type of the device; and determining a risk score associated with the device based at least in part on the device identifier, the device credentials, the current firmware revision of the device, and on whether any known vulnerabilities are associated with the type of the device.

17 Claims, 3 Drawing Sheets

(56) References Cited

U.S. PATENT DOCUMENTS

| | | | | |
|---|---|---|---|---|
| 2014/0123124 A1* | 5/2014 | Gray | .................... | G06F 8/654 |
| | | | | 717/170 |
| 2019/0349261 A1 | 11/2019 | Smith et al. | | |
| 2020/0285761 A1 | 9/2020 | Buck et al. | | |
| 2022/0171851 A1* | 6/2022 | Tsirkin | ................. | G06F 21/577 |
| 2022/0188425 A1 | 6/2022 | Wyatt et al. | | |
| 2022/0335116 A1* | 10/2022 | Brazao | ............... | H04L 41/0813 |
| 2022/0335165 A1* | 10/2022 | Brazao | ................... | G06F 21/44 |
| 2022/0335431 A1* | 10/2022 | Brazao | ................ | G06F 21/554 |
| 2022/0394044 A1* | 12/2022 | Brazao | ................ | H04L 63/126 |
| 2025/0061201 A1* | 2/2025 | Das | ...................... | G06F 21/572 |
| 2025/0190578 A1* | 6/2025 | Reddy | ................. | G06F 21/577 |

* cited by examiner

302 — Receive a provisioning request from a device including a device identifier, device credentials, and a current firmware revision 304 — Verify authenticity of device based on device identifier and credentials 306 — Verify that current firmware revision matches a master firmware revision 308 — Calculate risk score

ANALYZING RISK FOR DEVICES WITHIN A MANAGED ENVIRONMENT

TECHNICAL FIELD

The present disclosure relates in general to information handling systems, and more particularly to techniques for analyzing risk for devices within a managed environment.

BACKGROUND OF THE INVENTION

In a managed network environment, devices may be provisioned by a management server when the devices are first connected to the network. For example, the management server may provide policies governing the use of the new device, configuration information for the new device, or may, in some cases, exclude the device from being used in the network environment. Such a configuration may provide a network owner with a high degree of control over the devices that are used on the network, and enable the network owner to standardize the configuration of like devices on the network.

SUMMARY OF THE INVENTION

In accordance with embodiments of the present disclosure, a method for analyzing risk for devices within a managed environment includes receiving, from a network, a provisioning request from a device including a device identifier, device credentials, and a current firmware revision, wherein the provisioning request indicates that the device is newly connected to the managed environment; verifying the authenticity of the device based at least in part on the device identifier and the device credentials; verifying that the current firmware revision of the device matches a master firmware revision associated with a type of the device; and determining a risk score associated with the device based at least in part on the device identifier, the device credentials, the current firmware revision of the device, and on whether any known vulnerabilities are associated with the type of the device.

In some cases, the provisioning request is received by the server at a factory-provisioned network address present in the device.

In some cases, the device is a peripheral device, and wherein the provisioning request is received by the server after being sent by the device upon being first connected to another device within the managed environment.

In some implementations, the process 300 further includes determining that the risk score associated with the device exceeds a threshold risk score; and in response, performing at least one security action.

In some cases, the at least one security action includes at least one of notifying an administrator of the managed environment that the risk score associated with the device exceeds a threshold risk score, or excluding the device from the managed environment.

In some implementations, the process 300 further includes determining that the risk score associated with the device does not exceed a threshold risk score; and in response, allowing the device to operate within the managed environment.

In some cases, the process further includes receiving a report of a potential vulnerability associated with the type of the device; and in response, updating the risk score associated with the device based on the potential vulnerability.

In accordance with embodiments of the present disclosure, a system for analyzing risk for devices within a managed environment performs operations including receiving, from a network, a provisioning request from a device including a device identifier, device credentials, and a current firmware revision, wherein the provisioning request indicates that the device is newly connected to the managed environment; verifying the authenticity of the device based at least in part on the device identifier and the device credentials; verifying that the current firmware revision of the device matches a master firmware revision associated with a type of the device; and determining a risk score associated with the device based at least in part on the device identifier, the device credentials, the current firmware revision of the device, and on whether any known vulnerabilities are associated with the type of the device.

In accordance with embodiments of the present disclosure, an article of manufacture includes a non-transitory, computer-readable medium having computer-executable instructions thereon that are executable by a processor of a computer system to perform operations for analyzing risk for devices within a managed environment including receiving, from a network, a provisioning request from a device including a device identifier, device credentials, and a current firmware revision, wherein the provisioning request indicates that the device is newly connected to the managed environment; verifying the authenticity of the device based at least in part on the device identifier and the device credentials; verifying that the current firmware revision of the device matches a master firmware revision associated with a type of the device; and determining a risk score associated with the device based at least in part on the device identifier, the device credentials, the current firmware revision of the device, and on whether any known vulnerabilities are associated with the type of the device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

In a managed network ecosystem, a security vulnerability on a device within the ecosystem may introduce a risk that any or all components within the ecosystem will be compromised. This threat continuously changes over time as components are added, removed and software or firmware is updated. The present disclosure describes techniques by which devices within a network ecosystem may be verified upon entry or connection to the ecosystem, and by which the security risk introduced to the ecosystem by each device may quantified in the form of a risk score for each device.

Figure 1:
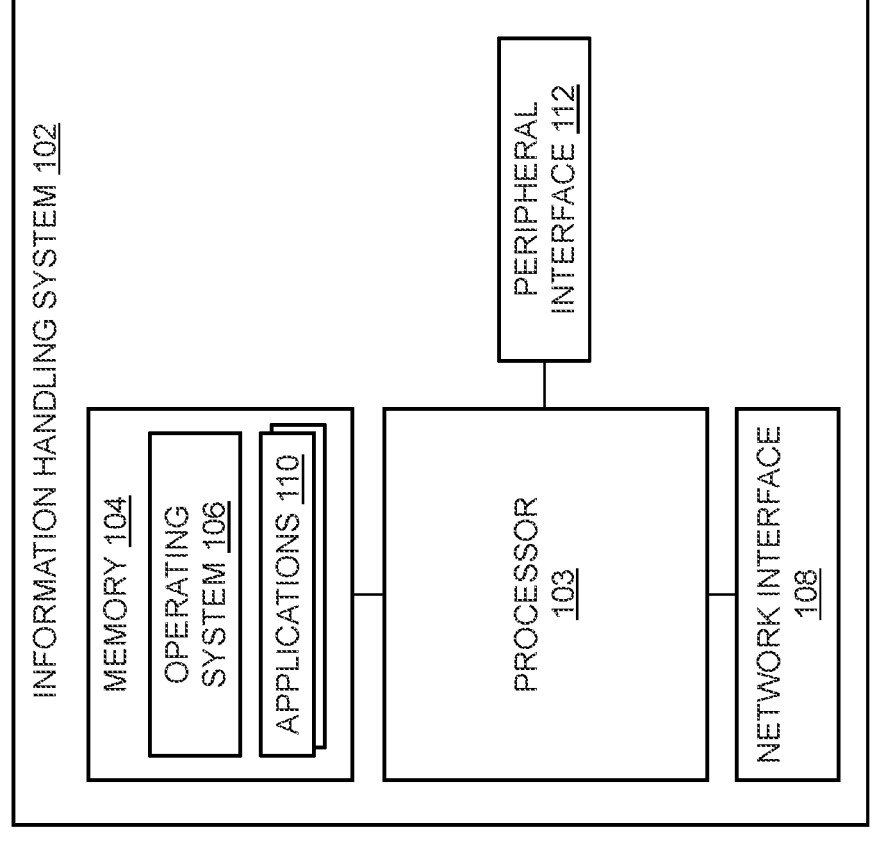
FIG. 1 illustrates a block diagram of an example information handling system, in accordance with embodiments of the present disclosure.
Figure 2:
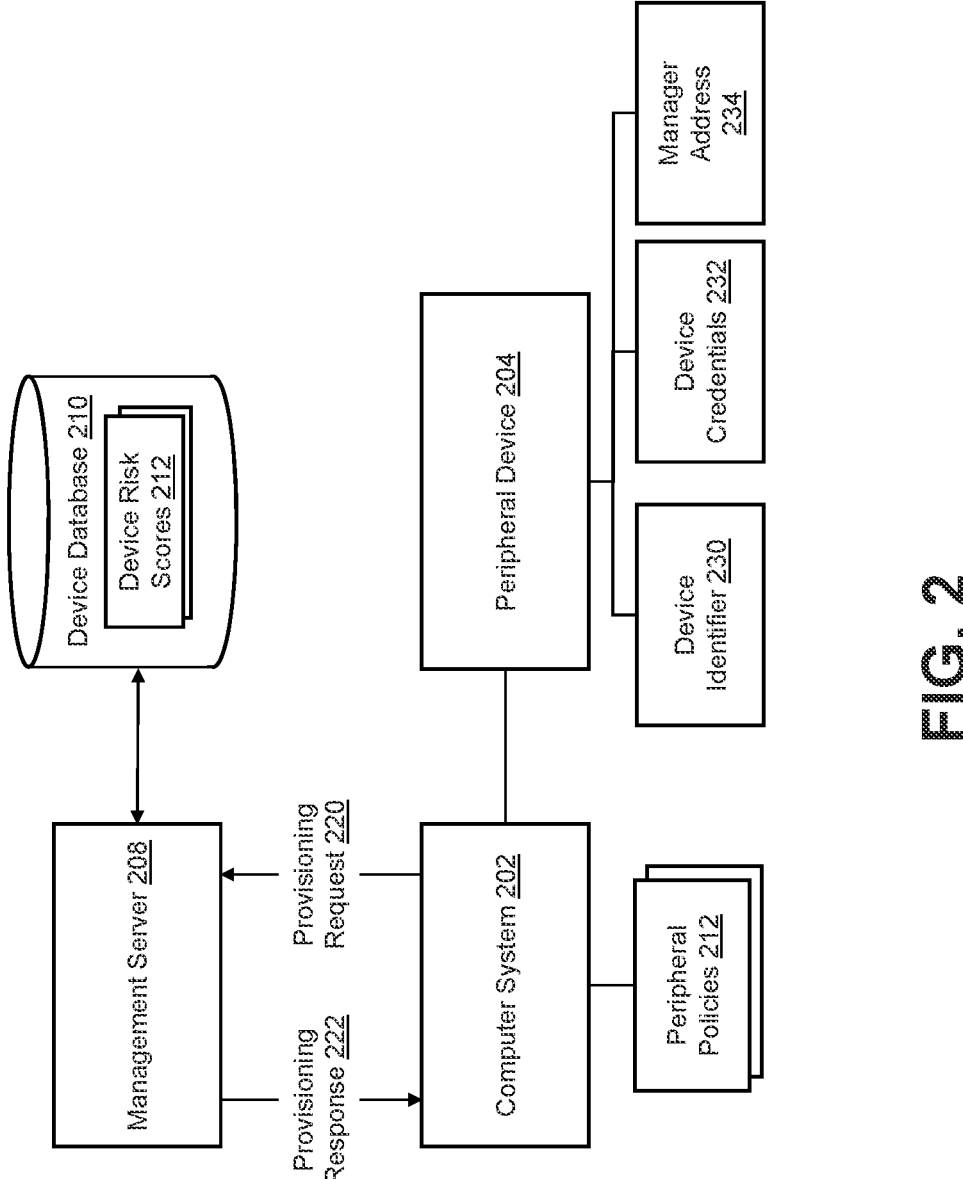
FIG. 2 illustrates a block diagram of an example network environment for analyzing risk for devices, in accordance with embodiments of the present disclosure.
Figure 2:
Figure 3:
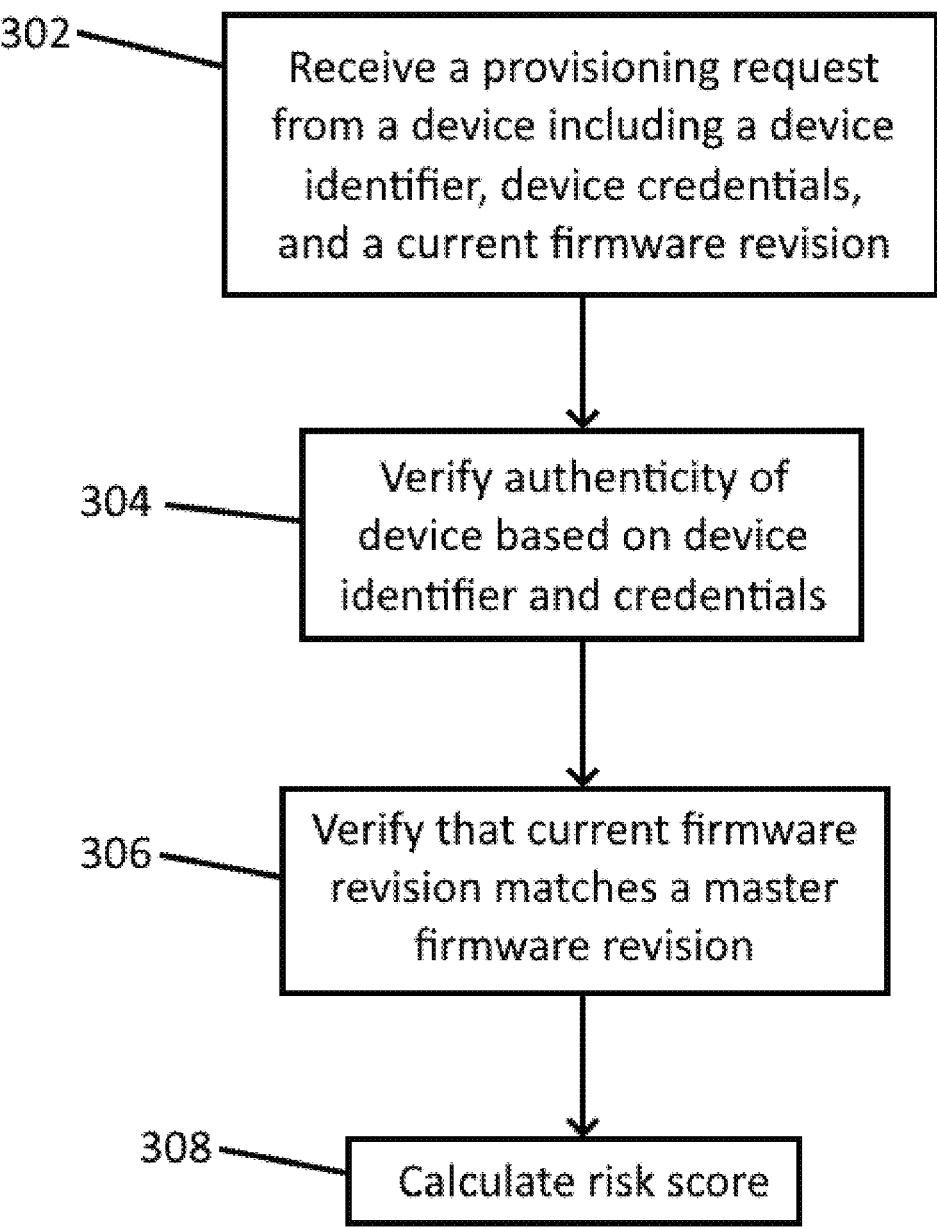
FIG. 3 illustrates a flow chart of an example process for analyzing risk for devices in a managed environment, in accordance with embodiments of the present disclosure.

Preferred embodiments and their advantages are best understood by reference to FIGS. 1 through 3, wherein like numbers are used to indicate like and corresponding parts.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, and a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Memory 104 may also have stored thereon one or more applications 110. Each of the applications 110 may comprise any program of executable instructions (or aggregation of programs of executable instructions) configured to make use of the hardware resources of the information handling system 102, such as memory, processor time, disk space, input and output devices (e.g., 112, 114), and the like. In some implementations, the applications 110 may interact with the operating system 106 to make of the hardware resources, and the operating system 106 may manage and control the access of the applications 110 to these resources (as described above).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include more than one processor 103. For example, one such processor 103 may be a CPU, and other processors 103 may include various other processing cores such as application processing units (APUs) and graphics processing units (GPUs).

Information handling system 102 further includes a peripheral interface 112 operable to receive and maintain connections with peripheral devices. In some cases, the peripheral interface 112 may be a universal serial bus (USB) controller, a DISPLAYPORT controller, a BLUETOOTH controller, or any other type of peripheral interface known in the art.

FIG. 2 illustrates a block diagram of an example network environment for analyzing risk for devices, in accordance with embodiments of the present disclosure. the depicted network environment 200 represents an interaction between the computer system 202 and the management server 208 that occurs when peripheral device 204 is connected to computer system 202 (e.g., via USB or a similar connection technology). As shown, the peripheral device 204 includes a device identifier 230, device credentials 232, and a manager address 234. In some cases, the device identifier 230, device credentials 232, and manager address 234 are stored in a firmware storage of the peripheral device 204. In some implementations, the device identifier 230, device credentials 232, and manager address 234 are stored in the firmware storage of the peripheral device 204 by a manufacturer of the peripheral device 204. In some cases, the device credentials 232 may include an encryption key, and a network certificate for the manager address 234. The manager address 234 may be a network address assigned to the management server 208.

As shown, the computer system 202 sends a provisioning request 220 over the network (not pictured) upon connection of the peripheral device 204. In some cases, the provisioning request 220 includes the device identifier 230 and the device credentials 232 stored on the firmware of the peripheral device 204. The provisioning request 220 may be sent to the network address denoted by the manager address 234 stored in the firmware of the peripheral device. In some implementations, the computer system 202 may encrypt the provisioning request 220 using the device credentials 232 (e.g., the encryption key) of the peripheral device 204.

Upon receipt of the provisioning request 220, the management server 208 may retrieve information related to the peripheral device 204 from the device database 210. For example, the device database 210 may include information about the peripheral device 204 indexed by the device identifier 230, such as the type of device, an encryption key for decrypting the provisioning request, and other information. In some implementations, some or all of the information about the peripheral device 204 in the device database 210 made be provided by a manufacturer of the device.

Based on the information in the provisioning request 220 and the information retrieved from the device database 210, the management server 208 verifies the authenticity of the peripheral device 204. For example, if the encryption key from the device database 210 fails to decrypt the provisioning request 220, then the management server 208 may determine that the peripheral device 204 is not authentic. If the encryption key from the device database 210 successfully decrypts the provisioning request 220, then the management server 208 may determine that the peripheral device 204 is authentic.

The management server 208 may calculate a risk score 212 for the peripheral device 204. The risk score 212 may quantify an amount of risk to the security of the network ecosystem that will be introduced by allowing the peripheral device 204 to be used within the network ecosystem. For example, if the peripheral device 204 has a known security vulnerability, it may be assigned a higher risk score than a device with no known vulnerability. In some cases, the risk score 212 may be adjusted based on a severity or potential impact associated with the known vulnerability. For example, a vulnerability that could enable an attacker to use the peripheral device 204 as a platform to attack other parts of the network ecosystem may lead to a high risk score, while a vulnerability that affected only the peripheral device 204 may lead to a lower risk score. In some implementations, the risk score 212 for a particular device may updated periodically, such as, for example, when a new vulnerability is discovered. The risk score 212 may be used for policy decisions regarding devices on the network. For example, a device with a risk score above a certain threshold may be excluded from the network ecosystem entirely by assigning it an appropriate policy. The connection of a device with a risk score above a certain threshold may cause the management server 208 to take immediate action, such as notifying a user of the computer system 202 or a network administrator that a high risk device has been connected. In some cases, the management server 208 may quarantine the computer system 202 from the rest of the network ecosystem until the high risk device is disconnected.

If the management server 208 successfully verifies the authenticity of the peripheral device 204, and determines that the determined risk score for the peripheral device 204 does not warrant immediate action (e.g., quarantining), the management server 208 sends a provisioning response 222 to the computer system 202 over the network. The provisioning response 222 may include a policy for the computer system 202 to apply to the peripheral device 204 while it is in use. For example, the policy may specify that the peripheral device 204 may not be used outside of a corporate workspace, may not be used when the computer system 202 is not connected to a particular virtual private network (VPN), or other restrictions on the use of the peripheral device 204. In some cases, the policy may specify that use of the peripheral device 204 is prohibited, for example, where the management server 208 determines that the peripheral device 204 is not authentic or that is a type of device with a known security vulnerability.

FIG. 3 illustrates a flow chart of an example process for analyzing risk for devices in a managed environment, in accordance with embodiments of the present disclosure.

At 302, a provisioning request is received from a device including a device identifier, device credentials, and a current firmware revision, wherein the provisioning request indicates that the device is newly connected to the managed environment. At 304, the authenticity of the device is verified based at least in part on the device identifier and the device credentials. At 306, it is verified that the current firmware revision of the device matches a master firmware revision associated with a type of the device. At 308, a risk score associated with the device is determined based at least in part on the device identifier, the device credentials, the current firmware revision of the device, and on whether any known vulnerabilities are associated with the type of the device.

In some cases, the provisioning request is received by the server at a factory-provisioned network address present in the device.

In some cases, the device is a peripheral device, and wherein the provisioning request is received by the server after being sent by the device upon being first connected to another device within the managed environment.

In some implementations, the process 300 further includes determining that the risk score associated with the device exceeds a threshold risk score; and in response, performing at least one security action.

In some cases, the at least one security action includes at least one of notifying an administrator of the managed environment that the risk score associated with the device exceeds a threshold risk score, or excluding the device from the managed environment.

In some implementations, the process 300 further includes determining that the risk score associated with the device does not exceed a threshold risk score; and in response, allowing the device to operate within the managed environment.

In some cases, the process further includes receiving a report of a potential vulnerability associated with the type of the device; and in response, updating the risk score associated with the device based on the potential vulnerability.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

For the purposes of this disclosure, e term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
   receiving, by a server including at least one processor from a network, a provisioning request from a device including a device identifier, device credentials, and a current firmware revision, wherein the device is a peripheral device, wherein the provisioning request is received by the server after being sent by the device upon being first connected to another device within a managed environment, and wherein the provisioning request indicates that the device is newly connected to the managed environment;
   verifying, by the server, the authenticity of the device based at least in part on the device identifier and the device credentials;
   determining, by the server, a risk score associated with the device based at least in part on the device identifier, the device credentials, the current firmware revision of the device, and on whether any known vulnerabilities are associated with the device; and
   in response to the risk score, the server implementing a policy to be applied to the device, wherein the policy includes a restriction on use of the device outside of a virtual private network (VPN).

2. The method of claim 1, wherein the provisioning request is received by the server at a factory provisioned network address present in the device.

3. The method of claim 1, further comprising:
   determining, by the server, that the risk score associated with the device exceeds a threshold risk score; and
   in response, performing, by the server, at least one security action.

4. The method of claim 3, wherein the at least one security action includes at least one of notifying an administrator of the managed environment that the risk score associated with the device exceeds a threshold risk score, or excluding the device from the managed environment.

5. The method of claim 1, further comprising:
   determining, by the server, that the risk score associated with the device does not exceed a threshold risk score; and
   in response, allowing the device to operate within the managed environment.

6. The method of claim 1, further comprising:
   receiving, by the server, a report of a potential vulnerability associated with the type of the device; and
   in response, updating, by the server, the risk score associated with the device based on the potential vulnerability.

7. A system comprising:
   a computer system including at least one processor and a memory, and configured to perform operations including:

receiving, from a network, a provisioning request from a device including a device identifier, device credentials, and a current firmware revision, wherein the device is a peripheral device, wherein the provisioning request is received by the server after being sent by the device upon being first connected to another device within a managed environment, and wherein the provisioning request indicates that the device is newly connected to the managed environment;

verifying the authenticity of the device based at least in part on the device identifier and the device credentials;

determining a risk score associated with the device based at least in part on the device identifier, the device credentials, the current firmware revision of the device, and on whether any known vulnerabilities are associated with the device; and in response to the risk score, implementing a policy to be applied to the device, wherein the policy includes a restriction on use of the device outside of a virtual private network (VPN).

8. The system of claim 7, wherein the provisioning request is received by the server at a factory provisioned network address present in the device.

9. The system of claim 7, the operations further comprising:

determining that the risk score associated with the device exceeds a threshold risk score; and in response, performing at least one security action.

10. The system of claim 9, wherein the at least one security action includes at least one of notifying an administrator of the managed environment that the risk score associated with the device exceeds a threshold risk score, or excluding the device from the managed environment.

11. The system of claim 7, the operations further comprising:

determining that the risk score associated with the device does not exceed a threshold risk score; and in response, allowing the device to operate within the managed environment.

12. The system of claim 7, the operations further comprising:

receiving a report of a potential vulnerability associated with the type of the device; and in response, updating the risk score associated with the device based on the potential vulnerability.

13. An article of manufacture comprising a non-transitory, computer-readable medium having computer-executable instructions thereon that are executable by a processor of a computer system to perform operations comprising:

receiving, from a network, a provisioning request from a device including a device identifier, device credentials, and a current firmware revision, wherein the device is a peripheral device, wherein the provisioning request is received by the server after being sent by the device upon being first connected to another device within a managed environment, and wherein the provisioning request indicates that the device is newly connected to the managed environment;

verifying the authenticity of the device based at least in part on the device identifier and the device credentials;

determining a risk score associated with the device based at least in part on the device identifier, the device credentials, the current firmware revision of the device, and on whether any known vulnerabilities are associated with the device; and in response to the risk score, implementing a policy to be applied to the device, wherein the policy includes a restriction on use of the device outside of a virtual private network (VPN).

14. The article of claim 13, wherein the provisioning request is received by the server at a factory provisioned network address present in the device.

15. The article of claim 13, the operations further comprising:

determining that the risk score associated with the device exceeds a threshold risk score; and in response, performing at least one security action.

16. The article of claim 15, wherein the at least one security action includes at least one of notifying an administrator of the managed environment that the risk score associated with the device exceeds a threshold risk score, or excluding the device from the managed environment.

17. The article of claim 13, the operations further comprising:

determining that the risk score associated with the device does not exceed a threshold risk score; and in response, allowing the device to operate within the managed environment.

\* \* \* \* \*